No. 649,948. Patented May 22, 1900.
J. J. PARNELL & W. H. WILSON.
AXLE FOR VEHICLES.
(Application filed July 19, 1899.)

(No Model.)

WITNESSES
John Buckler,
F. A. Stewart.

INVENTORS
John J. Parnell
William H. Wilson
BY
ATTORNEYS.

THE NORRIS PETERS CO., PHOTO-LITHO., WASHINGTON, D. C.

UNITED STATES PATENT OFFICE.

JOHN JOSEPH PARNELL AND WILLIAM HORACE WILSON, OF LAKE CITY, FLORIDA.

AXLE FOR VEHICLES.

SPECIFICATION forming part of Letters Patent No. 649,948, dated May 22, 1900.

Application filed July 19, 1899. Serial No. 724,432. (No model.)

*To all whom it may concern:*

Be it known that we, JOHN JOSEPH PARNELL and WILLIAM HORACE WILSON, citizens of the United States, residing at Lake City, in the county of Columbia and State of Florida, have invented certain new and useful Improvements in Spindles for the Axles of Vehicles, of which the following is a full and complete specification, such as will enable those skilled in the art to which it appertains to make and use the same.

This invention relates to spindles for the axles of vehicles; and the object thereof is to provide an improved adjustable device of this class which is simple in construction and operation and which is particularly adapted for use in connection with light vehicles, but which may be employed in connection with heavy vehicles of all kinds.

The invention is fully disclosed in the following specification, of which the accompanying drawings form a part, in which—

Figure 1:
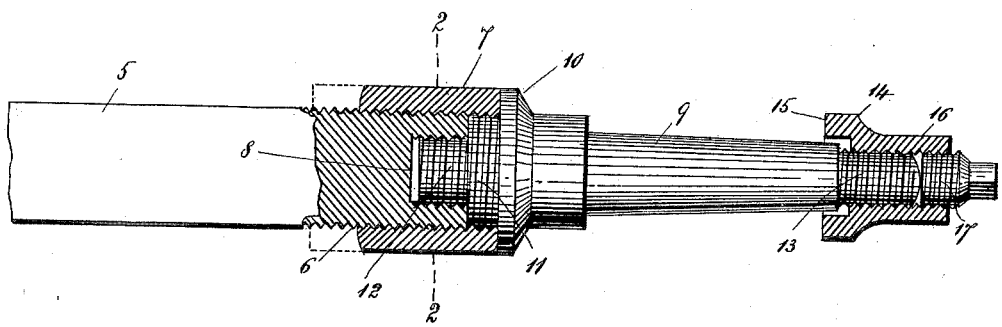
Figure 2:
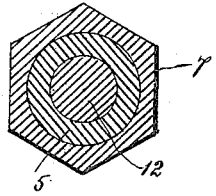

Figure 1 is a side view of a part of the axle of a vehicle and showing our improved spindle connected therewith, part of the construction being in section; and Fig. 2, a transverse section on the line 2 2 of Fig. 1.

In the drawings forming part of this specification, the separate parts of our improvement are designated by the same numerals of reference in each of the views; and in said drawings we have shown at 5 a part of the axle of a vehicle, which is screw-threaded at the end, as shown at 6, and provided with a sleeve 7, the outer surface of which is angular in form, as shown in Fig. 2, so that a wrench may be applied thereto.

The end of the axle 5 is provided with a screw-threaded socket 8, and the spindle 9 is provided with an annular shoulder or enlargement 10 and with a screw-threaded portion 11, the same in diameter as the end of the axle 5, and the screw-threaded portion 11 of the spindle 9 is provided with a screw-threaded extension 12, which is adapted to enter the screw-threaded socket 8 of the axle, and in connecting the spindle with the axle the sleeve 7 is turned backwardly on the spindle into the position shown in dotted lines in Fig. 1, and the end of the spindle is then screwed into the end of the axle, after which the sleeve 7 is turned or moved outwardly until it fully engages the screw-threaded portion 11 of the spindle, as clearly shown in Fig. 1.

The end of the spindle is provided with a screw-threaded extension 13, and mounted thereon is a hub-nut 14, provided with an inwardly-directed flange or rim 15 and an outwardly-directed cylindrical extension 16, into which is screwed a set-nut 17.

By means of the set-nut 17 the position of the hub-nut 14, which holds the wheel in place, may be regulated, as will be readily understood, and the flange or rim 15 on the hub-nut projects inwardly far enough to overlap the screw-threaded extension 13 of the spindle 9 at all times when the device is in use.

By means of this construction we provide a spindle which is adapted for use in connection with wheels having hubs of various lengths and we also provide a detachable spindle, whereby new spindles may be substituted for the old ones at any time.

Our improvement is simple in construction and operation and well adapted to accomplish the result for which it is intended and does not add materially to the cost of the vehicle to which it is applied.

Having fully described our invention, we claim as new and desire to secure by Letters Patent—

An axle for vehicles provided with a screw-threaded end and a screw-threaded socket in said end, a spindle provided with a screw-threaded portion equal in diameter to the screw-threaded end of the axle, and with a screw-threaded extension which fits said screw-threaded socket in the end of the axle, said spindle being provided with an annular enlargement, and a screw-threaded sleeve which is arranged to engage at its end with said enlargement and which fits the screw-threaded end of the axle, and said screw-threaded portion of said spindle the diameter of which is equal to the diameter of the screw-threaded end of said axle, substantially as shown and described.

In testimony that we claim the foregoing as our invention we have signed our names, in presence of the subscribing witnesses, this 6th day of July, 1899.

JOHN JOSEPH PARNELL.
WILLIAM HORACE WILSON.

Witnesses:
 GUY GILLEN,
 SCOTT GILLEN.